(12) United States Patent
Imai

(10) Patent No.: US 12,430,740 B2
(45) Date of Patent: Sep. 30, 2025

(54) PATTERN INSPECTION APPARATUS AND PATTERN INSPECTION METHOD

(71) Applicant: OXIDE CORPORATION, Yamanashi (JP)

(72) Inventor: Shinichi Imai, Yamanashi (JP)

(73) Assignee: OXIDE CORPORATION, Hokuto (JP)

( * ) Notice: Subject to any disclaimer, the term of this patent is extended or adjusted under 35 U.S.C. 154(b) by 0 days.

(21) Appl. No.: 17/886,129

(22) Filed: Aug. 11, 2022

(65) Prior Publication Data
US 2023/0058818 A1 Feb. 23, 2023

(30) Foreign Application Priority Data

Aug. 18, 2021 (JP) .................. 2021-133293

(51) Int. Cl.
G01N 21/956 (2006.01)
G01N 21/95 (2006.01)
G06T 7/00 (2017.01)
H04N 23/56 (2023.01)

(52) U.S. Cl.
CPC ....... G06T 7/0004 (2013.01); G01N 21/9501 (2013.01); H04N 23/56 (2023.01); G06T 2207/10152 (2013.01); G06T 2207/30148 (2013.01)

(58) Field of Classification Search
None
See application file for complete search history.

(56) References Cited

U.S. PATENT DOCUMENTS

| 8,664,817 | B2 | 3/2014 | Rumbaugh et al. |
| 8,692,115 | B2 | 4/2014 | Rumbaugh et al. |
| 8,704,416 | B2 | 4/2014 | Rumbaugh et al. |
| 8,772,997 | B2 | 7/2014 | Rumbaugh et al. |
| 2004/0262522 | A1 | 12/2004 | Kitahara et al. |

(Continued)

FOREIGN PATENT DOCUMENTS

| JP | 2002-221496 A | 8/2002 |
| JP | 2005-049363 A | 2/2005 |

(Continued)

OTHER PUBLICATIONS

May 7, 2025 Office Action issued in Japanese Patent Application No. 2021-133293.

(Continued)

Primary Examiner — Samuel D Fereja
(74) Attorney, Agent, or Firm — Oliff PLC

(57) ABSTRACT

A pattern inspection apparatus includes a light source, a detector, and an inspection unit. The light source is configured to emit light toward an inspection target including stacked silicon substrates. The light has a wavelength band that is greater than or equal to 1.2 micrometers and less than or equal to 5.0 micrometers. The detector is configured to detect transmitted light of the inspection target or reflected light of the inspection target out of the light emitted from the light source. The transmitted light is light transmitted through the inspection target. The reflected light is light reflected by the inspection target. The inspection unit is configured to perform pattern inspection on the basis of a detection result obtained by the detector.

4 Claims, 5 Drawing Sheets

(56) References Cited

U.S. PATENT DOCUMENTS

| | | | | |
|---|---|---|---|---|
| 2007/0103893 A1* | 5/2007 | Tanaka | ............ | G01N 21/956 |
| | | | | 362/138 |
| 2012/0063931 A1 | 3/2012 | Rumbaugh et al. | | |
| 2012/0063932 A1 | 3/2012 | Rumbaugh et al. | | |
| 2012/0063933 A1 | 3/2012 | Rumbaugh et al. | | |
| 2012/0063934 A1 | 3/2012 | Rumbaugh et al. | | |
| 2012/0307257 A1* | 12/2012 | Yoshii | ............ | G01N 21/4795 |
| | | | | 359/290 |
| 2013/0329222 A1 | 12/2013 | Kudo | | |
| 2015/0253256 A1* | 9/2015 | Zhou | ............ | G01N 21/9501 |
| | | | | 356/237.5 |
| 2019/0033232 A1* | 1/2019 | Ahn | ............ | H01L 22/12 |
| 2021/0140899 A1* | 5/2021 | Park | ............ | G01N 21/95607 |

FOREIGN PATENT DOCUMENTS

| | | | |
|---|---|---|---|
| JP | 2013-068551 A | 4/2013 | |
| WO | 2012-063859 A1 | 5/2012 | |
| WO | 2012/115013 A1 | 8/2012 | |

OTHER PUBLICATIONS

Aug. 12, 2025 Office Action issued in Japanese Patent Application No. 2021-133293.

* cited by examiner

PATTERN INSPECTION APPARATUS AND PATTERN INSPECTION METHOD

CROSS-REFERENCE TO RELATED APPLICATIONS

The present application claims priority from Japanese Patent Application No. 2021-133293 filed on Aug. 18, 2021, the entire contents of which are hereby incorporated by reference.

BACKGROUND

The technology relates to a pattern inspection apparatus and a pattern inspection method.

Recently, in terms of advancing high integration of integrated circuits, it has reached a physical limit to miniaturize circuits. This has led to stacking of circuits, i.e., three-dimensionalization of circuits. For existing planar circuits, it is possible to perform non-destructive inspection to check defects of all the products to be actually used. For example, Japanese Unexamined Patent Application Publication No. 2013-068551 discloses to apply nanometer-order light to a circuit pattern and to detect a defect of the circuit pattern on the basis of a diffraction image obtained by the nanometer-order light application.

SUMMARY

A pattern inspection apparatus according to an embodiment of the technology includes a light source, a detector, and an inspection unit. The light source is configured to emit light toward an inspection target including stacked silicon substrates. The light has a wavelength band that is greater than or equal to 1.2 micrometers and less than or equal to 5.0 micrometers. The detector is configured to detect transmitted light of the inspection target or reflected light of the inspection target out of the light emitted from the light source. The transmitted light is light transmitted through the inspection target. The reflected light is light reflected by the inspection target. The inspection unit is configured to perform pattern inspection on the basis of a detection result obtained by the detector.

A pattern inspection method according to an embodiment of the technology includes: emitting light toward an inspection target including stacked silicon substrates, the light having a wavelength band that is greater than or equal to 1.2 micrometers and less than or equal to 5.0 micrometers; detecting transmitted light of the inspection target or reflected light of the inspection target out of the light emitted toward the inspection target, the transmitted light being light transmitted through the inspection target, the reflected light being light reflected by the inspection target; and performing pattern inspection on the basis of a detection result obtained by the detecting.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
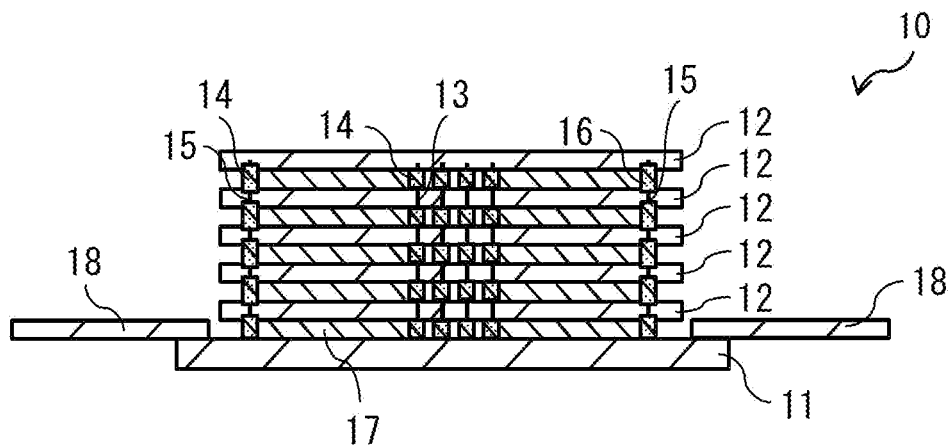
FIG. 1 is a diagram illustrating an example of an inspection target of a pattern inspection apparatus according to one example embodiment of the technology.

Regarding three-dimensional circuits, difficulty in detecting defects of internal circuit patterns has been an issue. It is desirable to provide a pattern inspection apparatus and a pattern inspection method that each allow for also detecting a defect of an internal circuit pattern in a three-dimensional circuit.

In the following, some example embodiments of the technology are described in detail with reference to the accompanying drawings. Note that the following description is directed to illustrative examples of the disclosure and not to be construed as limiting to the technology. Factors including, without limitation, dimensions, dimension ratios, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

1. Inspection Target

FIG. 1 illustrates a cross-sectional configuration example of an inspection target 10 that is an example of an object to be inspected by a pattern inspection apparatus according to an example embodiment of the technology. The inspection target 10 may be a three-dimensional (3D) chip in which a plurality of large-scale integration (LSI) chips 12 is stacked on an intermediate substrate 11. The number of stacked layers of the LSI chips 12 is not limited to five layers as illustrated in FIG. 1, and may be about ten layers, for example. Provided between the stacked LSI chips 12 may be a resin filling layer 17 that fills gaps between the LSI chips 12. The resin filling layer 17 may include, for example, a resin material such as polyimide.

The LSI chips 12 may each include a Si substrate and an integrated circuit provided thereon. Non-limiting examples of each of the LSI chips 12 may include a wafer of a 3D flash memory and a camera sensor device. The integrated circuit on the Si substrate of each of the LSI chips 12 may include, for example but not limited to, a number of complementary metal oxide semiconductors (CMOSs) and a number of wiring patterns.

The LSI chips 12 may each have, for example but not limited to, a signal through via 13 and a power-supply through via 15 that run through the Si substrate. The stacked LSI chips 12 may be electrically coupled to each other by means of, for example but not limited to, the signal through vias 13 and signal bumps 14. The signal bumps 14 may be provided between the LSI chips 12. The integrated circuits of the respective LSI chips 12 may receive various signals from outside via, for example but not limited to, the signal through vias 13 and the signal bumps 14. The integrated circuits of the respective LSI chips 12 may supply various signals to the outside via, for example but not limited to, the signal through vias 13 and the signal bumps 14. The stacked LSI chips 12 may be electrically coupled to each other by means of, for example but not limited to, the power-supply through vias 15 and power-supply bridges 16. The power-supply bridges 16 may be provided between the LSI chips 12. The power-supply bridges 16 may each be formed by a method such as electroless plating. The integrated circuits of the respective LSI chips 12 may receive various power-supply voltages from the outside via, for example but not limited to, the power-supply through vias 15 and the power-supply bridges 16.

The intermediate substrate 11 may include a wiring layer and a resin layer that supports the wiring layer. The wiring layer may be adapted to, for example, transmit various signals to the stacked LSI chips 12 or supply various power-supply voltages to the stacked LSI chips 12. In one example, the wiring layer may include a passive component such as a resistor. Coupled to the intermediate substrate 11 may be one or more interface units 18. The one or more interface units 18 may be electrically coupled to the wiring layer of the intermediate substrate 11. For example, the one or more interface units 18 may supply various signals or various power-supply voltages from the outside to the intermediate substrate 11, and may supply various signals from the intermediate substrate 11 to the outside.

With an existing pattern inspection apparatus, in a case where the inspection target is the 3D chip as described above, it is difficult to detect a defect of an internal circuit pattern that is not visible on a chip surface. To address this, the inventor of the application proposes below a pattern inspection apparatus that is able to also detect a defect of an internal circuit pattern that is not visible on a chip surface.

2. First Example Embodiment

Configuration

Figure 2:
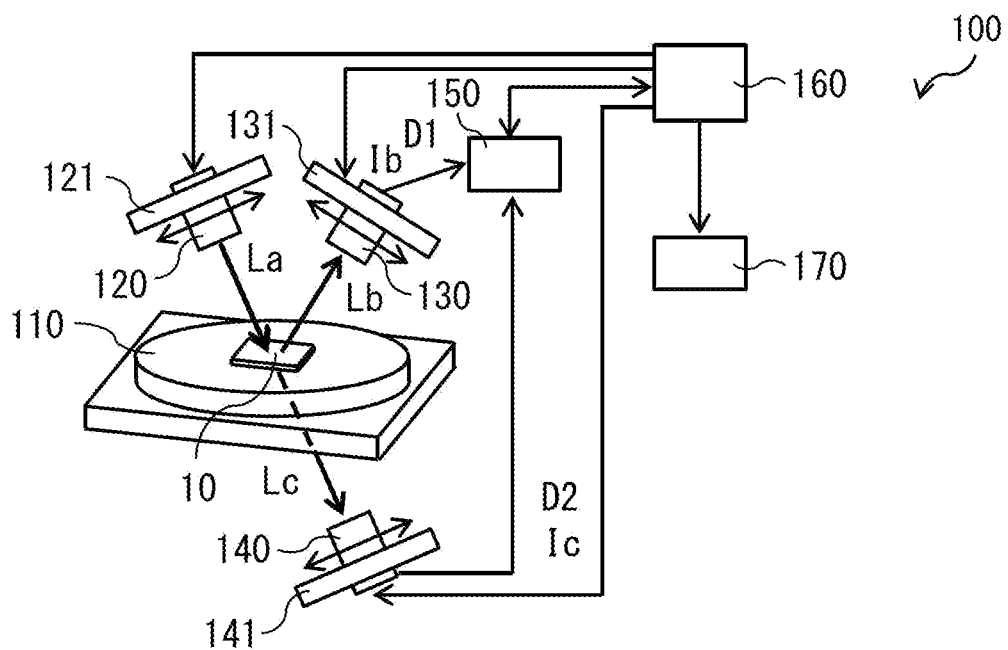
FIG. 2 is a diagram illustrating a schematic configuration example of a pattern inspection apparatus according to one example embodiment of the technology.

Next, a description is given of a pattern inspection apparatus 100 according to a first example embodiment of the technology. FIG. 2 illustrates an example of a schematic configuration of the pattern inspection apparatus 100. The pattern inspection apparatus 100 may perform non-destructive inspection of a defect in the inspection target 10. For example, as illustrated in FIG. 2, the pattern inspection apparatus 100 may include a stage 110 and a light source 120. The stage 110 may support the inspection target 10. The light source 120 may emit or apply light La toward the inspection target 10 on the stage 110.

For example, the stage 110 may suck the inspection target 10 to thereby fix the inspection target 10 on an upper surface of the stage 110. In addition, in one example, the stage 110 may include a mechanism that moves a position of the upper surface of the stage 110 biaxially in a plane parallel to the upper surface of the stage 110. In addition, in one example, the stage 110 may include a mechanism that rotates the upper surface of the stage 110 azimuthally in the plane parallel to the upper surface of the stage 110.

Figure 3:
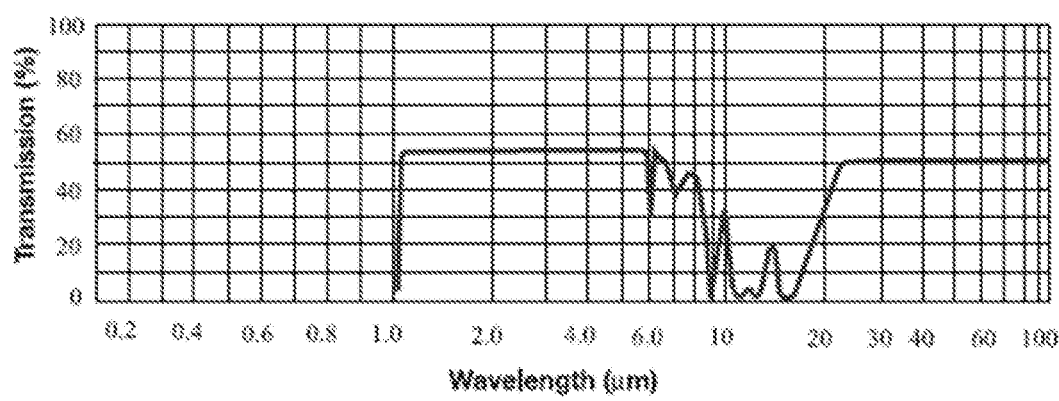
FIG. 3 is a diagram illustrating an example of a transmission characteristic of a Si substrate.

The light source 120 may include a laser configured to emit the light La and a control circuit that controls light emission of the laser. The control circuit may control the light emission of the laser on the basis of a control performed by a processor 160 which will be described later. The laser may be configured to emit, as the light La, collimated light having a wavelength band that is greater than or equal to 1.2 µm and less than or equal to 5.0 µm, i.e., a wavelength band of a mid-infrared region. The laser may be, for example, a Tm:YAG laser configured to emit the light La having a constant wavelength of 2.0 µm. The laser is, however, not limited to the Tm:YAG laser. In place of the above-described laser, the light source 120 may include, for example, a light emitting device, such as a semiconductor laser, configured to emit the light La having a wavelength of 2.0 µm. For example, as illustrated in FIG. 3, the above-described mid-infrared region falls within a portion of a light transmission region of the Si substrate. Accordingly, the light La is able to be transmitted through the Si substrate and the inspection target 10 including the Si substrate.

When the light La is incident on the inspection target 10, a portion of the incident light La may be reflected by the inspection target 10 to become reflected light Lb, which may be incident on a light detector 130 to be described later; another portion of the incident light La may be transmitted through the inspection target 10 to become transmitted light Lc, which may be incident on a light detector 140 to be described later. The inspection target 10 may be optically regarded as a volume Bragg grating. In this case, the reflected light Lb may be reflected Bragg diffraction light that is a diffraction image generated by light reflected inside the inspection target 10. The reflected light Lb may have high diffraction intensity in a particular direction. The transmitted light Lc may be transmitted Bragg diffraction light that is a volume diffraction image generated by the transmitted light of the inspection target 10. The transmitted light Lc may also have high diffraction intensity in a particular direction.

As illustrated in FIG. 2, the pattern inspection apparatus 100 may further include, for example but not limited to, the light detectors 130 and 140.

The light detector 130 may be disposed on an optical path of the reflected light Lb. The light detector 130 may detect the reflected light Lb on the basis of a control performed by the processor 160 which will be described later. The light detector 130 may generate image data Ib on the basis of a result of the detection, i.e., a detection result D1, and supply the generated image data Ib to an inspection unit 150 which will be described later. Note that, in one example, the light detector 130 may supply the detection result D1 to the inspection unit 150.

The light detector 140 may be disposed on an optical path of the transmitted light Lc. The light detector 140 may detect the transmitted light Lc on the basis of a control performed by the processor 160 which will be described later. The light detector 140 may generate image data Ic on the basis of a result of the detection, i.e., a detection result D2, and supply the generated image data Ic to the inspection unit 150 which will be described later. Note that, in one example, the light detector 140 may supply the detection result D2 to the inspection unit 150.

The light detectors 130 and 140 may each include, for example, an image sensor configured to detect light in the above-described mid-infrared region. For example, such an image sensor may include, for each pixel, an InGaAs element that is sensitive to a wavelength band from a visible region to a wavelength of 1.7 μm. Note that the element provided for each pixel is not limited to the InGaAs element.

The pattern inspection apparatus 100 may further include, for example, a mover 121 that varies a position of the light source 120, a mover 131 that varies a position of the light detector 130, and a mover 141 that varies a position of the light detector 140, as illustrated in FIG. 2. The mover 121 may so set the position of the light source 120 that the light La emitted from the light source 120 is incident obliquely on a surface of the inspection target 10. The mover 121 may vary the position of the light source 120 on the basis of a control performed by the processor 160 which will be described later, to thereby vary an incident angle of the light La emitted from the light source 120 with respect to the inspection target 10. The mover 131 may vary the position of the light detector 130 on the basis of a control performed by the processor 160 which will be described later, to thereby cause the light detector 130 or a light reception surface of the image sensor to stay on the optical path of the reflected light Lb.

The pattern inspection apparatus 100 may further include, for example, the inspection unit 150, the processor 160, and a display 170, as illustrated in FIG. 2.

The inspection unit 150 may perform pattern inspection of the inspection target 10 on the basis of the detection result D1 obtained from the light detector 130 and the detection result D2 obtained from the light detector 140. For example, the inspection unit 150 may perform the pattern inspection of the inspection target 10 with use of the image data Ib and the image data Ic. The inspection unit 150 may perform the pattern inspection on the basis of a plurality of detection results D1 and a plurality of detection results D2 obtained in a process in which the incident angle of the light La with respect to the inspection target 10 is varied by the mover 121. Such detection results D1 and detection results D2 may each be referred to as test data. For example, the inspection unit 150 may perform the pattern inspection on the basis of a plurality of pieces of image data Ib and a plurality of pieces of image data Ic obtained in the process in which the incident angle of the light La with respect to the inspection target 10 is varied by the mover 121. Such pieces of image data Ib and image data Ic may each be referred to as the test data. Thus, the pieces of test data may include the detection results D1 that differ from each other in the incident angle and the detection results D2 that differ from each other in the incident angle, or the pieces of image data Ib that differ from each other in the incident angle and the pieces of image data Ic that differ from each other in the incident angle.

Note that, in one example, in a case where the inspection unit 150 acquires the detection result D1 from the light detector 130 and acquires the detection result D2 from the light detector 140, the inspection unit 150 may generate the image data Ib on the basis of the detection result D1 acquired from the light detector 130 and may generate the image data Ic on the basis of the detection result D2 acquired from the light detector 140.

The inspection unit 150 may have, as pieces of master data, a plurality of detection results D1 and D2 or a plurality of pieces of image data Ib and Ic obtained from an inspection target 10 having no defect. The pieces of master data may include the detection results D1 that differ from each other in the incident angle and the detection results D2 that differ from each other in the incident angle, or the pieces of image data Ib that differ from each other in the incident angle and the pieces of image data Ic that differ from each other in the incident angle. The inspection unit 150 may compare the master data and the test data that are the same as each other in the incident angle, to thereby determine presence or absence of an unusual point regarding the inspection target 10 from which the test data has been acquired. The unusual point may refer to a factor that suggests presence of a defect. Examples of a comparison method may include a method of obtaining a difference between the master data and the test data. In a case where the inspection unit 150 determines the absence of the unusual point as a result of the comparison, the inspection unit 150 may generate information indicating the absence of the unusual point and supply the generated information to the processor 160. In contrast, in a case where the inspection unit 150 determines the presence of the unusual point, the inspection unit 150 may generate information indicating the presence of the unusual point and supply the generated information to the processor 160.

In one example, the inspection unit 150 may compare the detection result D1 and the detection result D2 that are the same as each other in the incident angle or may compare the image data Ib and the image data Ic that are the same as each other in the incident angle to thereby determine the presence or absence of the unusual point regarding the inspection target 10. Examples of a comparison method may include a method of obtaining a difference between the detection result D1 and the detection result D2 and a method of obtaining a difference between the image data Ib and the image data Ic. In this case, the master data may be unnecessary in determining the presence or absence of the unusual point regarding the inspection target 10.

In one example, the inspection unit 150 may have a learning model that has learned with use of teaching data including, for example, the detection result D1 and the detection result D2 or the image data Ib and the image data Ic obtained from the inspection target 10 having no defect; and detection results D1 and detection results D2 or pieces of image data Ib and pieces of image data Ic obtained from a plurality of inspection targets 10 that differ from each other in a factor such as a location of a defect or a kind of a defect. In this case, the inspection unit 150 may input the test data in the learning model, and cause the learning model to determine the presence or absence of the unusual point regarding the inspection target 10 from which the inputted test data has been acquired. The inspection unit 150 may supply a determination result obtained by the learning model to the processor 160.

In one example, the inspection unit 150 may have a learning model that has learned with use of teaching data including, for example, a difference between the detection result D1 and the detection result D2 obtained from the inspection target 10 having no defect; and a difference between detection results D1 and detection results D2 obtained from a plurality of inspection targets 10 that differ from each other in a factor such as a location of a defect or a kind of a defect. In this case, the inspection unit 150 may input in the learning model a difference between a detection result D1 and a detection result D2 obtained from the inspection target 10 for testing, and cause the learning model to determine the presence or absence of the unusual point regarding the inspection target 10 for testing. The inspection unit 150 may supply a determination result obtained by the learning model to the processor 160.

In one example, the inspection unit 150 may have a learning model that has learned with use of teaching data including, for example, a difference between the image data Ib and the image data Ic obtained from the inspection target 10 having no defect; and a difference between pieces of image data Ib and pieces of image data Ic obtained from a plurality of inspection targets 10 that differ from each other in a factor such as a location of a defect or a kind of a defect. In this case, the inspection unit 150 may input in the learning model a difference between image data Ib and image data Ic obtained from the inspection target 10 for testing, and cause the learning model to determine the presence or absence of the unusual point regarding the inspection target 10 for testing. The inspection unit 150 may supply a determination result obtained by the learning model to the processor 160.

The processor 160 may control the light source 120, the light detectors 130 and 140, and the movers 121, 131, and 141. The processor 160 may control turning on and off of light emission of the light source 120. The processor 160 may control light reception of the light detectors 130 and 140. The processor 160 may control a position to which the mover 121 moves the light source 120, a position to which the mover 131 moves the light detector 130, and a position to which the mover 141 moves the light detector 140. The processor 160 may supply the display 170 with image data including the determination result obtained by the inspection unit 150. The display 170 may display the image data supplied from the processor 160.

Operation

Figure 4:
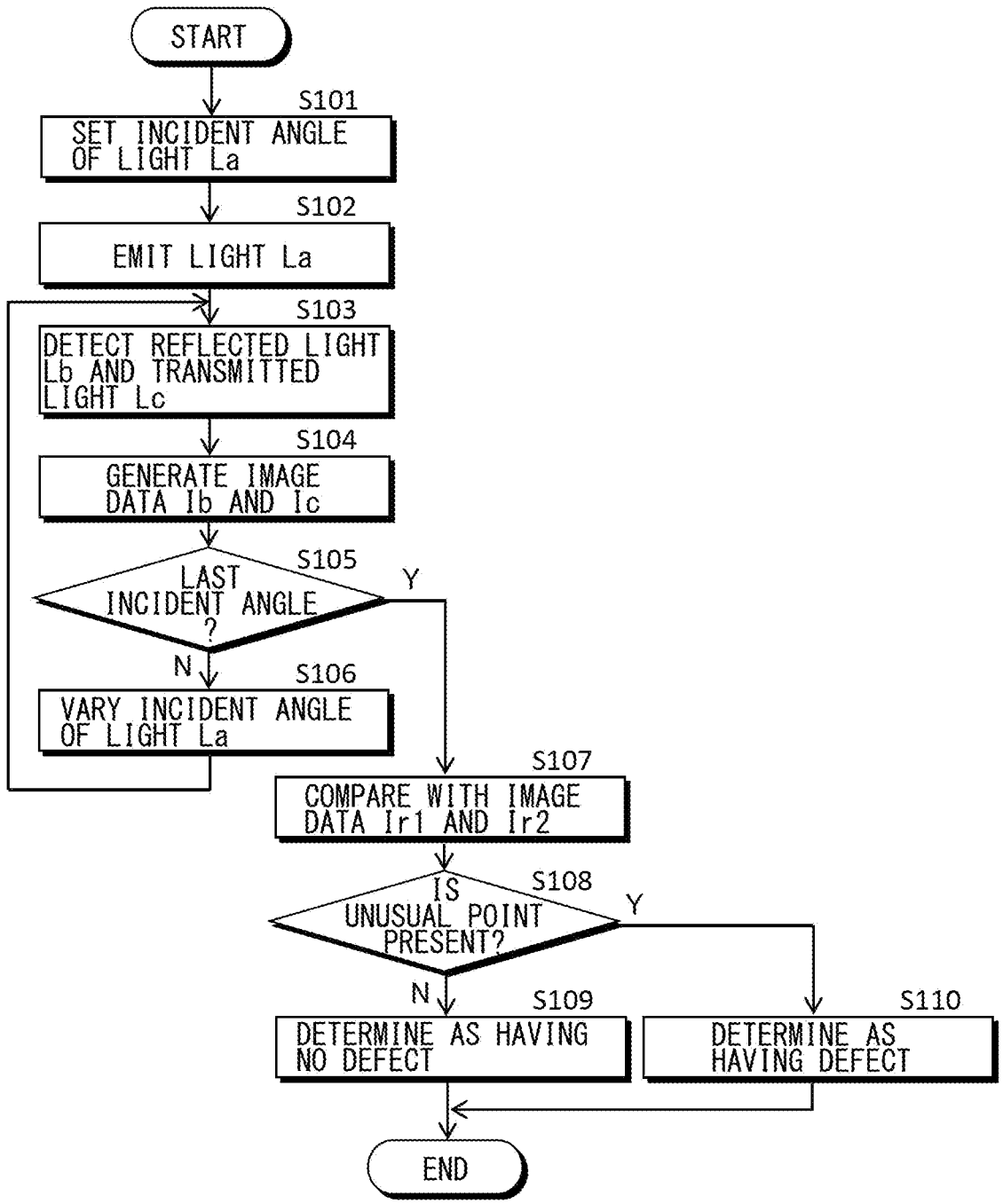
FIG. 4 is a diagram illustrating an example of an inspection procedure to be performed by the pattern inspection apparatus illustrated in FIG. 2.

Next, referring to FIG. 4, a description is given of an example of inspection of the inspection target 10 to be performed by the pattern inspection apparatus 100.

First, the processor 160 may set the incident angle of the light La (step S101). To set the incident angle of the light La to a predetermined value within a sweep range, i.e., to a start point, the processor 160 may supply a signal regarding position information to the mover 121. On the basis of the signal supplied from the processor 160, the mover 121 may so move the light source 120 that the incident angle of the light La becomes the predetermined value, i.e., the start point. Thereafter, the processor 160 may supply a signal to start light emission to the light source 120. On the basis of the signal supplied from the processor 160, the light source 120 may emit the light La (step S102).

Thereafter, the processor 160 may supply a signal to start light detection to each of the light detectors 130 and 140. The light detector 130 may detect the reflected light Lb on the basis of the signal supplied from the processor 160 (step S103). The light detector 130 may generate the image data Ib on the basis of the detection result D1 and supply the generated image data Ib to the inspection unit 150 (step S104). The light detector 140 may detect the transmitted light Lc on the basis of the signal supplied from the processor 160 (step S103). The light detector 140 may generate the image data Ic on the basis of the detection result D2 and supply the generated image data Ic to the inspection unit 150 (step S104).

The processor 160 may determine whether the currently set incident angle is the last incident angle within the sweep range, i.e., an end point (step S105). If the currently set incident angle is not the last incident angle within the sweep range, i.e., is not the end point (step S105: N), the processor 160 may vary the incident angle of the light La within the sweep range (step S106). For example, the processor 160 may supply a signal regarding the position information to the mover 121 to set the incident angle of the light La to a value that is shifted from the currently set incident angle toward the end point by a predetermined amount. Thereafter, the processor 160 may execute processes in the respective steps S103 to S105.

In contrast, if the currently set incident angle corresponds to the last incident angle within the sweep range, i.e., to the end point (step S105: Y), the processor 160 may end the varying of the incident angle of the light La and supply the inspection unit 150 with a signal to start incident-angle-based comparison between the pieces of image data Ib and Ic each of which is the test data and pieces of image data Ir1 and Ir2 each of which is the master data. The inspection unit 150 may perform the incident-angle-based comparison described above (step S107). The image data Ir1 may correspond to the image data Ib obtained from the inspection target 10 having no defect. The image data Ir2 may correspond to the image data Ic obtained from the inspection target 10 having no defect.

For example, the inspection unit 150 may obtain a difference between the image data Ib and the image data Ir1, which is hereinafter referred to as a "difference α", and may also obtain a difference between the image data Ic and the image data Ir2, which is hereinafter referred to as a "difference β". For example, the inspection unit 150 may determine whether the differences α and β involve any unusual point (step S108). If the difference α, the difference β, or both are determined as involving unusual points as a result (step S108: Y), the inspection unit 150 may determine that the inspection target 10 has a defect (step S110). In contrast, if neither the difference α nor the difference β is determined as involving unusual points as a result (step S108: N), the inspection unit 150 may determine that the inspection target 10 has no defect (step S109).

The processor 160 may generate image data including the determination result obtained by the inspection unit 150, and supply the generated image data to the display 170. The display 170 may display the image data supplied from the processor 160. In such a manner, the pattern inspection apparatus 100 may perform the inspection of the inspection target 10.

Effects

Next, a description is given of effects of the pattern inspection apparatus 100 according to the first example embodiment.

Recently, in terms of advancing high integration of integrated circuits, it has reached a physical limit to miniaturize circuits. This has led to stacking of circuits, i.e., three-dimensionalization of circuits. For existing planar circuits, it is possible to perform non-destructive inspection to check defects of all the products to be actually used. For example, Japanese Unexamined Patent Application Publication No. 2013-068551 discloses to apply nanometer-order light to a circuit pattern and to detect a defect of the circuit pattern on the basis of a diffraction image obtained by the nanometer-order light application. When it comes to three-dimensional circuits, however, difficulty in detecting defects of internal circuit patterns has been an issue.

According to the first example embodiment of the technology, out of the light La emitted toward the inspection target 10 and having the wavelength band that is greater than or equal to 1.2 µm and less than or equal to 5.0 the transmitted light Lc of the inspection target 10 or the reflected light Lb of the inspection target 10 is detected. This allows for performing pattern inspection on the basis of a detection result obtained by the detection. Accordingly, it is possible to also detect a defect of an internal circuit pattern in a three-dimensional circuit.

In addition, according to the first example embodiment, the pattern inspection may be performed on the basis of the plurality of detection results D1 and the plurality of detection results D2 or the plurality of pieces of image data Ib and the plurality of pieces of image data Ic obtained by the detectors 130 and 140 in the process in which the incident angle is varied. This makes it possible to also detect a defect of the internal circuit pattern in the three-dimensional circuit.

Note that, in the first example embodiment, the inspection unit 150 may perform the pattern inspection on the basis of the detection result D1 or the detection result D2 in one example. In addition, in the first example embodiment, the inspection unit 150 may perform the pattern inspection on the basis of the image data Ib or the image data Ic in one example. In such cases also, it is possible to also detect a defect of the internal circuit pattern in the three-dimensional circuit.

3. Second Example Embodiment

Configuration

Figure 5:
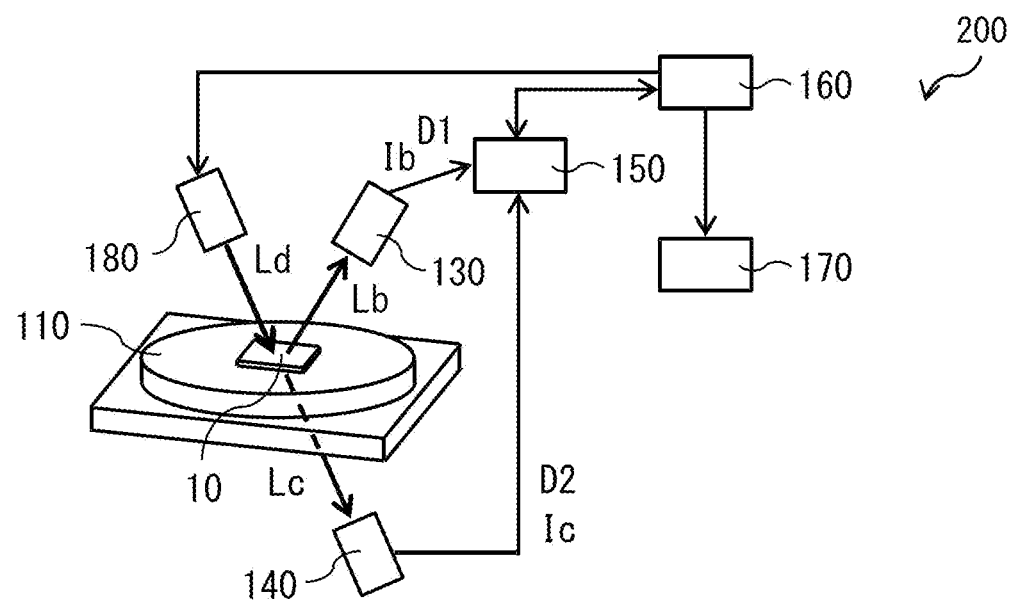
FIG. 5 is a diagram illustrating a schematic configuration example of a pattern inspection apparatus according to one example embodiment of the technology.

Next, a description is given of a pattern inspection apparatus 200 according to a second example embodiment of the technology. FIG. 5 illustrates an example of a schematic configuration of the pattern inspection apparatus 200. The pattern inspection apparatus 200 may perform non-destructive inspection of a defect in the inspection target 10. For example, as illustrated in FIG. 5, the pattern inspection apparatus 200 may correspond to the above-described pattern inspection apparatus 100 in which the movers 121, 131, and 141 are omitted and a light source 180 is provided in place of the light source 120. In the following, configurations common to the first example embodiment are denoted with the same numerals and descriptions of the configurations common to the first example embodiment are omitted where appropriate.

The light source 180 may include a laser configured to emit light Ld and a control circuit that controls light emission of the laser. The laser may be so disposed that the light Ld emitted from the laser is incident obliquely on the surface of the inspection target. The control circuit may control the light emission of the laser on the basis of a control performed by the processor 160. The laser may be configured to emit, as the light Ld, collimated light having a wavelength band that is greater than or equal to 1.2 µm and less than or equal to 5.0 µm, i.e., a wavelength band of the mid-infrared region. The laser may be, for example, a GaSb-based semiconductor laser configured to emit the light Ld having any wavelength within a range that is greater than or equal to 1.9 µm and less than or equal to 2.5 µm. The laser is, however, not limited to a semiconductor laser, and may be a solid-state laser. In one example, the laser may be a Cr:ZnSe laser configured to emit the light Ld having any wavelength within a range that is greater than or equal to 2.2 µm and less than or equal to 2.9 µm. The laser is not limited to the Cr:ZnSe laser. In place of the above-described laser, the light source 180 may include, for example, a light emitting device configured to emit the light Ld having any wavelength within a range that is greater than or equal to 2.2 µm and less than or equal to 2.9 µm. For example, as illustrated in FIG. 3, the above-described mid-infrared region is included in the light transmission region of the Si substrate. Accordingly, the light Ld is able to be transmitted through the Si substrate and the inspection target 10 including the Si substrate.

When the light Ld is incident on the inspection target 10, a portion of the incident light Ld may be reflected by the inspection target 10 to become reflected light Lb, which may be incident on the light detector 130; another portion of the incident light Ld may be transmitted through the inspection target 10 to become transmitted light Lc, which may be incident on the light detector 140. The inspection target 10 may be optically regarded as a volume Bragg grating. In this case, the reflected light Lb may be Bragg reflected light that is light diffracted inside the inspection target 10. The reflected light Lb may have high diffraction intensity in a particular direction. Similarly, the transmitted light Lc may also have high diffraction intensity in a particular direction.

The inspection unit 150 may perform pattern inspection of the inspection target 10 on the basis of the detection result D1 obtained from the light detector 130 and the detection result D2 obtained from the light detector 140. For example, the inspection unit 150 may perform the pattern inspection of the inspection target 10 with use of the image data Ib and the image data Ic. The inspection unit 150 may perform the pattern inspection on the basis of a plurality of detection results D1 and a plurality of detection results D2 obtained in a process in which the wavelength of the light Ld is varied. Such detection results D1 and such detection results D2 may each be referred to as test data. For example, the inspection unit 150 may perform the pattern inspection on the basis of a plurality of pieces of image data Ib and a plurality of pieces of image data Ic obtained in the process in which the wavelength of the light Ld is varied. Such pieces of image data Ib and such pieces of image data Ic may each be referred to as test data. Thus, the pieces of test data may include the detection results D1 that differ from each other in the wavelength of the light Ld and the detection results D2 that differ from each other in the wavelength of the light Ld, or the pieces of image data Ib that differ from each other in the wavelength of the light Ld and the pieces of image data Ic that differ from each other in the wavelength of the light Ld.

The inspection unit 150 may have, as pieces of master data, a plurality of detection results D1 and D2 or a plurality of pieces of image data Ib and Ic obtained from an inspection target 10 having no defect. The pieces of master data may include the detection results D1 that differ from each other in the wavelength of the light Ld and the detection results D2 that differ from each other in the wavelength of the light Ld, or the pieces of image data Ib that differ from each other in the wavelength of the light Ld and the pieces of image data Ic that differ from each other in the wavelength of the light Ld. The inspection unit 150 may compare the master data and the test data that are the same as each other in the wavelength of the light Ld, to thereby determine presence or absence of an unusual point regarding the inspection target 10 from which the test data has been acquired. The unusual point may refer to a factor that suggests presence of a defect. Examples of a comparison method may include a method of obtaining a difference between the master data and the test data. In a case where the inspection unit 150 determines the absence of the unusual point as a result of the comparison, the inspection unit 150 may generate information indicating the absence of the unusual point and supply the generated information to the processor 160. In contrast, in a case where the inspection unit 150 determines the presence of the unusual point, the inspection unit 150 may generate information indicating the presence of the unusual point and supply the generated information to the processor 160.

In one example, the inspection unit 150 may compare the detection result D1 and the detection result D2 that are the same as each other in the wavelength of the light Ld or may compare the image data Ib and the image data Ic that are the same as each other in the wavelength of the light Ld to thereby determine the presence or absence of the unusual point regarding the inspection target 10. Examples of a comparison method may include a method of obtaining a difference between the detection result D1 and the detection result D2 and a method of obtaining a difference between the image data Ib and the image data Ic. In this case, the master data may be unnecessary in determining the presence or absence of the unusual point regarding the inspection target 10.

The processor 160 may control the light source 180 and the light detectors 130 and 140. The processor 160 may control, for example, turning on and off of light emission of the light source 180 and the wavelength of the light emitted from the light source 180. The processor 160 may control light reception of the light detectors 130 and 140. The processor 160 may supply the display 170 with image data including the determination result obtained by the inspection unit 150. The display 170 may display the image data supplied from the processor 160.

Operation

Figure 6:
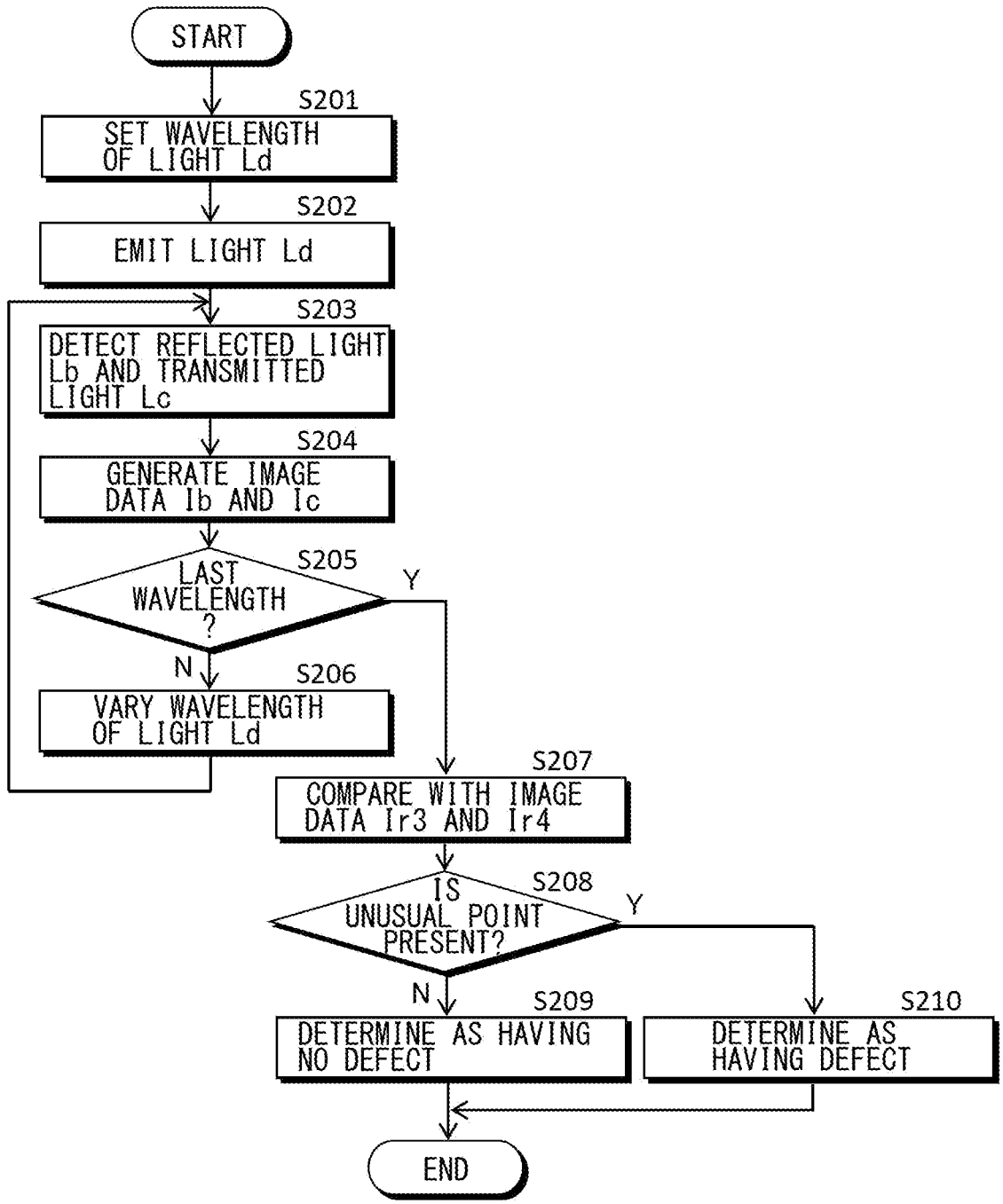
FIG. 6 is a diagram illustrating an example of an inspection procedure to be performed by the pattern inspection apparatus illustrated in FIG. 5.

Next, referring to FIG. 6, a description is given of an example of inspection of the inspection target 10 to be performed by the pattern inspection apparatus 200.

First, the processor 160 may set the wavelength of the light Ld (step S201). To set the wavelength of the light Ld to a predetermined value within a sweep range, i.e., to a start point, the processor 160 may supply a signal regarding a wavelength to the light source 180. On the basis of the signal supplied from the processor 160, the light source 180 may emit the light Ld having the wavelength of the predetermined value, i.e., the start point (step S202).

Thereafter, the processor 160 may supply a signal to start light detection to each of the light detectors 130 and 140. The light detector 130 may detect the reflected light Lb on the basis of the signal supplied from the processor 160 (step S203). The light detector 130 may generate the image data Ib on the basis of the detection result D1 and supply the generated image data Ib to the inspection unit 150 (step S204). The light detector 140 may detect the transmitted light Lc on the basis of the signal supplied from the processor 160 (step S203). The light detector 140 may generate the image data Ic on the basis of the detection result D2 and supply the generated image data Ic to the inspection unit 150 (step S204).

The processor 160 may determine whether the currently set wavelength of the light Ld is the last wavelength within the sweep range, i.e., an end point (step S205). If the currently set wavelength of the light Ld is not the last wavelength within the sweep range, i.e., is not the end point (step S205: N), the processor 160 may vary the wavelength of the light Ld within the sweep range (step S206). For example, the processor 160 may supply a signal regarding the wavelength to the light source 180 to set the wavelength of the light Ld to a value that is shifted from the currently set wavelength of the light Ld toward the end point by a predetermined amount. Thereafter, the processor 160 may execute processes in the respective steps S203 to S205.

In contrast, if the currently set wavelength of the light Ld corresponds to the last wavelength within the sweep range, i.e., to the end point (step S205: Y), the processor 160 may end the varying of the wavelength of the light Ld and supply the inspection unit 150 with a signal to start wavelength-based comparison between the pieces of image data Ib and Ic each of which is the test data and pieces of image data Ir3 and Ir4 each of which is the master data. The inspection unit 150 may perform the wavelength-based comparison described above (step S207). The image data Ir3 may correspond to the image data Ib obtained from the inspection target 10 having no defect. The image data Ir4 may correspond to the image data Ic obtained from the inspection target 10 having no defect.

For example, the inspection unit 150 may obtain a difference between the image data Ib and the image data Ir3, which is hereinafter referred to as a "difference α", and may also obtain a difference between the image data Ic and the image data Ir4, which is hereinafter referred to as a "difference β". For example, the inspection unit 150 may determine whether the differences α and β involve any unusual point (step S208). If the difference α, the difference β, or both are determined as involving unusual points as a result (step S208: Y), the inspection unit 150 may determine that the inspection target 10 has a defect (step S210). In contrast, if neither the difference α nor the difference β is determined as involving unusual points as a result (step S208: N), the inspection unit 150 may determine that the inspection target 10 has no defect (step S209).

The processor 160 may generate image data including the determination result obtained by the inspection unit 150, and supply the generated image data to the display 170. The display 170 may display the image data supplied from the processor 160. In such a manner, the pattern inspection apparatus 200 may perform the inspection of the inspection target 10.

Effects

Next, a description is given of effects of the pattern inspection apparatus 200 according to the second example embodiment.

According to the second example embodiment of the technology, out of the light Ld emitted toward the inspection target 10 and having the wavelength band that is greater than or equal to 1.2 μm and less than or equal to 5.0 the transmitted light Lc of the inspection target 10 or the reflected light Lb of the inspection target 10 is detected. This allows for performing pattern inspection on the basis of a detection result obtained by the detection. Accordingly, it is possible to also detect a defect of an internal circuit pattern in a three-dimensional circuit.

In addition, according to the second example embodiment, the pattern inspection may be performed on the basis of the plurality of detection results D1 and the plurality of detection results D2 or the plurality of pieces of image data Ib and the plurality of pieces of image data Ic obtained by the detectors 130 and 140 in the process in which the wavelength of the light Ld is varied. This makes it possible to also detect a defect of the internal circuit pattern in the three-dimensional circuit.

In each of a pattern inspection apparatus and a pattern inspection method according to one example embodiment of the technology, out of light emitted toward an inspection target and having a wavelength band that is greater than or equal to 1.2 μm and less than or equal to 5.0 transmitted light of the inspection target or reflected light of the inspection target is detected. Accordingly, it is possible to perform pattern inspection on the basis of a detection result obtained by the detection.

According to each of the pattern inspection apparatus and the pattern inspection method according to one example embodiment of the technology, out of light emitted toward an inspection target and having a wavelength band that is greater than or equal to 1.2 µm and less than or equal to 5.0 transmitted light of the inspection target or reflected light of the inspection target is detected. This allows for performing pattern inspection on the basis of a detection result obtained by the detection. Accordingly, it is possible to also detect a defect of an internal circuit pattern in a three-dimensional circuit.

Furthermore, the technology encompasses any possible combination of some or all of the various embodiments and the modifications described herein and incorporated herein. It is possible to achieve at least the following configurations from the above-described example embodiments of the technology.

(1)

A pattern inspection apparatus including:
a light source configured to emit light toward an inspection target including stacked silicon substrates, the light having a wavelength band that is greater than or equal to 1.2 micrometers and less than or equal to 5.0 micrometers;
a detector configured to detect transmitted light of the inspection target or reflected light of the inspection target out of the light emitted from the light source, the transmitted light being light transmitted through the inspection target, the reflected light being light reflected by the inspection target; and
an inspection unit configured to perform pattern inspection on the basis of a detection result obtained by the detector.

(2)

The pattern inspection apparatus according to (1), further including
a mover configured to vary a position of the light source to thereby vary an incident angle, with respect to the inspection target, of the light emitted from the light source, in which
the inspection unit is configured to perform the pattern inspection on the basis of a plurality of the detection results obtained by the detector in a process in which the incident angle is varied by the mover.

(3)

The pattern inspection apparatus according to (1), in which
the light source is configured to vary a wavelength of the light to emit within a range of the wavelength band, and
the inspection unit is configured to perform the pattern inspection on the basis of a plurality of the detection results obtained by the detector in a process in which the wavelength of the light to emit is varied by the light source.

(4)

The pattern inspection apparatus according to any one of (1) to (3), in which
the reflected light includes reflected Bragg diffraction light that is a diffraction image generated by light reflected inside the inspection target, and
the transmitted light includes transmitted Bragg diffraction light that is a volume diffraction image generated by the transmitted light of the inspection target.

(5)

A pattern inspection method including:
emitting light toward an inspection target including stacked silicon substrates, the light having a wavelength band that is greater than or equal to 1.2 micrometers and less than or equal to 5.0 micrometers;
detecting transmitted light of the inspection target or reflected light of the inspection target out of the light emitted toward the inspection target, the transmitted light being light transmitted through the inspection target, the reflected light being light reflected by the inspection target; and
performing pattern inspection on the basis of a detection result obtained by the detecting.

(6)

The pattern inspection method according to (5), further including:
varying an incident angle, with respect to the inspection target, of the light emitted toward the inspection target; and
performing the pattern inspection on the basis of a plurality of the detection results obtained in a process in which the incident angle is varied.

(7)

The pattern inspection method according to (5), further including
varying a wavelength of the light to emit within a range of the wavelength band; and
performing the pattern inspection on the basis of a plurality of the detection results obtained in a process in which the wavelength of the light to emit is varied.

(8)

The pattern inspection method according to any one of (5) to (7), in which
the reflected light includes reflected Bragg diffraction light that is a diffraction image generated by light reflected inside the inspection target, and
the transmitted light includes transmitted Bragg diffraction light that is a volume diffraction image generated by the transmitted light of the inspection target.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

What is claimed is:

1. A pattern inspection apparatus comprising:
a light source configured to emit laser light toward an inspection target including stacked silicon substrates, the laser light having a wavelength band that is greater than or equal to 1.2 micrometers and less than or equal to 5.0 micrometers;
a detector configured to detect, out of the laser light emitted from the light source, (i) transmitted Bragg diffraction light that is a volume diffraction image generated by transmitted light of the inspection target or (ii) reflected Bragg diffraction light that is a diffraction image generated by light reflected inside the inspection target, the transmitted light being light transmitted through the inspection target; and
an inspection unit configured to perform pattern inspection on a basis of a plurality of detection results obtained by the detector in a process in which an incident angle, with respect to the inspection target, of the laser light is swept by changing the incident angle during the process of obtaining the plurality of detection results, wherein
the inspection unit is configured to perform the pattern inspection on the basis of a result of a comparison, between the plurality of detection results and pieces of master data, for each of the swept incident angles.

2. A pattern inspection method comprising:

emitting laser light toward an inspection target including stacked silicon substrates and sweeping an incident angle, with respect to the inspection target, of the laser light, the laser light having a wavelength band that is greater than or equal to 1.2 micrometers and less than or equal to 5.0 micrometers;

detecting, out of the laser light emitted toward the inspection target, (i) transmitted Bragg diffraction light that is a volume diffraction image generated by transmitted light of the inspection target or (ii) reflected Bragg diffraction light that is a diffraction image generated by light reflected inside the inspection target, the transmitted light being light transmitted through the inspection target; and performing pattern inspection on a basis of a plurality of detection results obtained by the sweeping of the incident angle, with respect to the inspection target, of the laser light, the laser light being swept by changing the incident angle during the obtaining of the plurality of detection results, wherein the performing the pattern inspection comprises performing the pattern inspection on the basis of a result of a comparison, between the plurality of detection results and pieces of master data, for each of the swept incident angles.

3. A pattern inspection apparatus comprising:

a light source configured to emit laser light toward an inspection target including stacked silicon substrates, the laser light having a wavelength band that is greater than or equal to 1.2 micrometers and less than or equal to 5.0 micrometers;

a detector configured to detect, out of the laser light emitted from the light source, (i) transmitted Bragg diffraction light that is a volume diffraction image generated by transmitted light of the inspection target or (ii) reflected Bragg diffraction light that is a diffraction image generated by light reflected inside the inspection target, the transmitted light being light transmitted through the inspection target; and an inspection unit configured to perform pattern inspection on a basis of a plurality of detection results obtained by the detector in a process in which a wavelength of the laser light is swept within a range of the wavelength band, wherein the inspection unit is configured to perform the pattern inspection on the basis of a result of a comparison, between the plurality of detection results and pieces of master data, for each of the swept wavelengths.

4. A pattern inspection method comprising:

emitting laser light toward an inspection target including stacked silicon substrates and sweeping a wavelength of the laser light within a range of a wavelength band, the laser light having the wavelength band that is greater than or equal to 1.2 micrometers and less than or equal to 5.0 micrometers;

detecting, out of the laser light emitted toward the inspection target, (i) transmitted Bragg diffraction light that is a volume diffraction image generated by transmitted light of the inspection target or (ii) reflected Bragg diffraction light that is a diffraction image generated by light reflected inside the inspection target, the transmitted light being light transmitted through the inspection target; and performing pattern inspection on a basis of a plurality of detection results obtained by the sweeping of the wavelength of the laser light within the range of the wavelength band, wherein the performing the pattern inspection comprises performing the pattern inspection on the basis of a result of a comparison, between the plurality of detection results and pieces of master data, for each of the swept wavelengths.

* * * * *